United States Patent [19]

Zheng

[11] Patent Number: 5,390,182
[45] Date of Patent: Feb. 14, 1995

[54] SYSTEM FOR SYNCHRONOUS BANDWIDTH ALLOCATION IN TOKEN RING NETWORKS

[75] Inventor: Qin Zheng, Belmont, Mass.

[73] Assignee: Mitsubishi Electric Research Laboratories, Inc., Cambridge, Mass.

[21] Appl. No.: 99,918

[22] Filed: Jul. 30, 1993

[51] Int. Cl.$^6$ .............................................. H04J 3/02
[52] U.S. Cl. ................................. 370/85.5; 370/94.1; 370/100.1
[58] Field of Search ................. 370/85.5, 85.12, 85.14, 370/85.15, 95.3, 108, 60, 94.1, 60.1, 58.1, 58.3, 58.2, 100.1, 85.4

[56] References Cited

U.S. PATENT DOCUMENTS

| | | | |
|---|---|---|---|
| 4,809,267 | 2/1989 | Higuchi et al. | 370/85.15 |
| 4,942,574 | 7/1990 | Zelle | 370/85.15 |
| 4,998,246 | 3/1991 | Tanaka | 370/85.15 |
| 5,119,374 | 6/1992 | Firoozmand et al. | 370/85.15 |
| 5,191,580 | 3/1993 | Nakano et al. | 370/85.15 |
| 5,251,209 | 10/1993 | Jurkevich et al. | 370/94.1 |
| 5,291,491 | 3/1994 | Hutchinson et al. | 370/85.5 |

OTHER PUBLICATIONS

'FDDI Station Management (SMT)' Draft Proposed ANS, Oct. 7, 1993.
Klein et al. 'A Practitioner's Handbook for Real-Time Analysis' Kluwer Academic Publishers, Norwell, Mass., p. 4-2, 1993.
'Centurion Series V FDDI Concentrator' Distributed Systems International, Inc. Wheaton, Ill., 1993.

Primary Examiner—Douglas W. Olms
Assistant Examiner—Shick Hom
Attorney, Agent, or Firm—Robert K. Tendler

[57] ABSTRACT

A system is provided for generating the minimum synchronous bandwidth allocation $h_i$ for token ring networks in which this minimum bandwidth allocation is utilized by the node to request appropriate synchronous bandwidth reservation from the network manager. This permits the synchronous bandwidth allocation $h_i$ to be set dependent upon the minimum message generation period, T, the maximum message transmission time, C, the requested message delivery delay bound, d, and the target token rotation time of the network, TTRT. The system is not limited to d=T as is common in prior systems, but rather accommodates any value of d. As a result, the system is both simpler to implement, and covers many more applications having different message delivery time constraints. The calculation of $h_i$ is done by ensuring that the time that a node is allowed to transmit messages in the worst-case is no smaller than the time that the node needs to satisfy the message delivery time constraints.

2 Claims, 1 Drawing Sheet

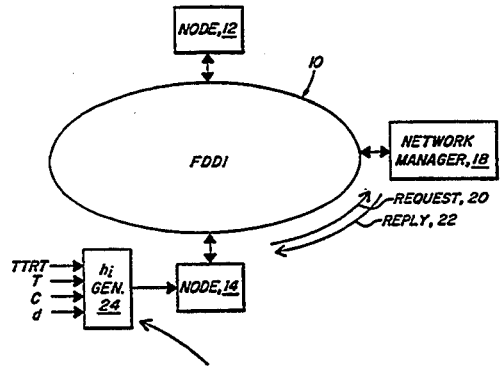

1. FOR $2 \times TTRT \leq d \leq T + TTRT$, $$h_i = \begin{cases} C/p & \text{if } q \geq C/p \\ (C+q)/(1+p) & \text{if } q < C/p \end{cases}$$

WHERE $p = \lfloor d/TTRT - 1 \rfloor$ and $q = \lceil d/TTRT \rceil TTRT - d$.

2. FOR $d \geq T + 2 \times TTRT$, $$h_i = (TTRT/T)C$$

3. FOR $T + TTRT < d < T + 2 \times TTRT$ and $T \geq TTRT$, $$h_i \leq \begin{cases} C/p & \text{if } q_0 \geq C/p_0 \\ (C+q_0)/(1+p_0) & \text{if } q_0 < C/p_0 \end{cases}$$

WHERE $p_0 = \lfloor T/TTRT \rfloor$ and $q_0 = \lceil T/TTRT \rceil TTRT - T$.

4. FOR $2 \times TTRT < d < T + 2 \times TTRT$ and $T < TTRT$, $$h_i \leq \lceil TTRT/T \rceil C.$$

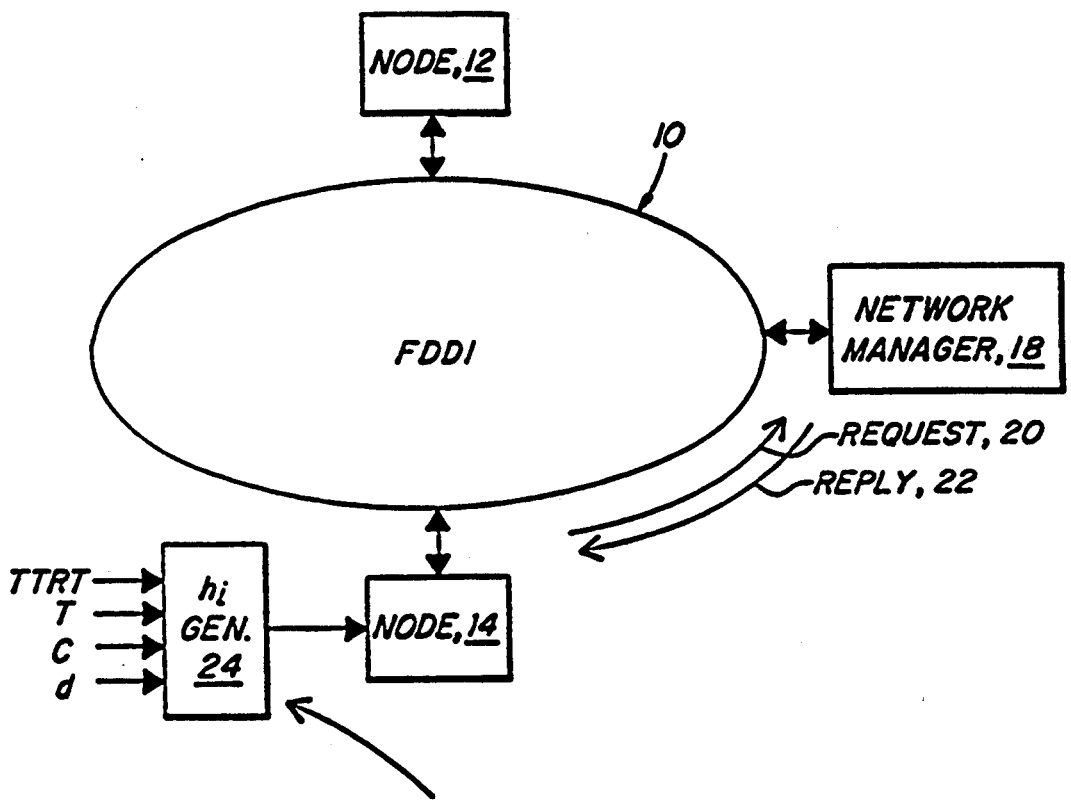

1. FOR $2 \times TTRT \leq d \leq T + TTRT$, $$h_i = \begin{cases} C/p & \text{if } q \geq C/p \\ (C+q)/(1+p) & \text{if } q < C/p \end{cases}$$

WHERE $p = \lfloor d/TTRT - 1 \rfloor$ and $q = \lceil d/TTRT \rceil TTRT - d$.

2. FOR $d \geq T + 2 \times TTRT$, $$h_i = (TTRT/T)C$$

3. FOR $T + TTRT < d < T + 2 \times TTRT$ and $T \geq TTRT$, $$h_i \leq \begin{cases} C/p & \text{if } q_0 \geq C/p_0 \\ (C+q_0)/(1+p_0) & \text{if } q_0 < C/p_0 \end{cases}$$

WHERE $p_0 = \lfloor T/TTRT \rfloor$ and $q_0 = \lceil T/TTRT \rceil TTRT - T$.

4. FOR $2 \times TTRT < d < T + 2 \times TTRT$ and $T < TTRT$, $$h_i \leq \lceil TTRT/T \rceil C.$$

SYSTEM FOR SYNCHRONOUS BANDWIDTH ALLOCATION IN TOKEN RING NETWORKS

FIELD OF THE INVENTION

This invention relates to a synchronous bandwidth allocation system for FDDI token ring networks to support such real-time applications as digital video/audio transmissions and distributed control/monitoring over computer networks.

BACKGROUND OF THE INVENTION

With the proliferation of small and medium sized personal computers located at a number of physically separated sites and used by a number of different users, there is also an accompanying need and desire to interface the individual computer sites into a large network in order to facilitate communications between and amongst each network site. As the number of sites in a network grows and the physical separation distance between networked sites grows, it is important to provide a network which will enable communication at a relatively high rate of speed in order to accommodate a large number of computers interconnected in on network.

One such large network is a token ring network. In a token ring configuration, a number of local sites are serially connected by a transmission medium to form a closed loop. Information is then transmitted sequentially, as a stream of data called a message, from one active station to the next. Each station generally regenerates and repeats each message and serves as the means for attaching one or more devices to the ring for the purpose of communicating with other devices on the ring. A given site that has access to the transmission medium transmits information onto the ring, where the information then circulates from one station to the next. The information is accompanied by an address which designates the destination sites and copies the information as it passes. The message travels around the serially interconnected stations and is finally returned to the initial source site which then removes the transmitted information from the ring.

A site gains the right to transmit its information onto the medium when it detects and captures a token passing on the medium. The token is a control signal comprised of a unique symbol sequence that circulates on the medium in addition to transmitted data. After the detection of a token, the site detecting the token may remove the token from the ring. That site may then transmit one or more flames of information, and at the completion of its data transmission, issues a new token which provides other sites the opportunity to gain access to the ring. The length of time in which a site may occupy the medium before passing the token is controlled by a token-holding timer.

In addition to ring access being arbitrated by a token, multiple levels of priority are available for independent and dynamic assignment of ring bandwidth, depending upon the relative class of service required. The classes of service are synchronous, asynchronous, or immediate service. For all classes of service, the allocation of a finite ring bandwidth occurs by mutual agreement among the users of the ring. The finite bandwidth is primarily divided into the formentioned classes as defined above into synchronous and asynchronous portions. Asynchronous communication defines a class of data transmission service in which all requests for service contend for a pool of dynamically allocated ring bandwidth and response time. Synchronous communication defines a class of data transmission service in which each requester is preallocated a maximum bandwidth and guaranteed a response time not to exceed a specific delay. Immediate data transmission is generally used only for extraordinary applications such as ring recovery.

When a number of network sites are distributed over distance of several miles, the transmission medium over which that data is transmitted becomes of much greater importance. One such transmission medium over which a number of network stations may be interconnected is a fiber optic medium. In a fiber optic medium, optical signals from light-generating transmitters are propagated through optical fiber wave-guides to light-detecting receivers. The above named classes of data transmission are implemented in a standardized fiber optic network defined as a fiber distributed data interface (FDDI). The FDDI generally consists of a number layers: a physical layer, which defines the physical requirements of the data interface; a data layer, which defines fair and deterministic access to the medium as well as a common protocol to ensure data integrity; and a station management layer, which defines the control necessary at the station level to manage the processes underway in the various FDDI layers. It is important that how applications use the services provided by the FDDI to support real-time communications. More specifically, it is important to provide a system of calculating the synchronous bandwidth allocation needed at a station to guarantee that each real-time message be transmitted within a requested delay bound.

Note that an FDDI token ring network provides a guaranteed throughput for synchronous messages and a bounded medium access delay for each node/station. However, this fact alone cannot effectively support many real-time applications that require the timely delivery of each and every critical message. The reason for this is that the FDDI guarantees a medium access delay bound to nodes, but not to messages. The message-delivery delays may exceed the medium-access delay bound even if messages are generated at a rate not larger than the guaranteed throughput.

For further background, the following is a list of articles describing prior techniques useful in token passing systems.

G. Agrawal, B. Chen, W. Zhao, and S. Davari. Guaranteeing synchronous message deadlines with the timed token protocol. In Proceedings of IEEE International Conference on Distributed Computing Systems. IEEE, June 1992; B. Chen, G. Agrawal, and W. Zhao. Optimal synchronous capacity allocation for hard real-time communications with the timed token protocol. In Proceedings of Real-Time Systems Symposium. IEEE, December 1992; FDDI Station Management (SMT)—draft proposed. American National Standard, ANSI X3T9/92-067, Jun. 25, 1992; Fiber Distributed Data Interface (FDDI)—Token Ring Media Access Control (MAC). American National Standard, ANSI X3.139, 1987; Domenico Ferrari and Dinesh C. Verma. A scheme for real-time channel establishment in wide-area networks. IEEE Journal on Selected Areas in Communications SAC-8(3):368–379, April 1990; Dilip D. Kandlur, Kang G. Shin, and Domenico Ferrari. Realtime communication in multi-hop networks. In Proceedings of 11th conference on Distributed Computer Systems, pages 300-307. IEEE, May 1991; Floyd E. Ross. An overview of FDDI: The fiber distributed data interface. IEEE Journal on Selected Areas in Communications, 7(7):1043-1051, September 1989; K. C. Sevcik and M. J. Johnson. Cycle time properties of the FDDI token ting protocol. Technical Report CSRI-179, Computer Science Research Institute, University of Toronto, 1986; K. G. Shin and Qin Zheng. FDDI-M: a scheme to double FDDI's ability of supporting synchronous traffic. Patent pending; Alfred C. Weaver. Local area networks and busses—an analysis. Technical report, Flight Data Systems, NASA-Johnson Space Center, 1986; Qin zheng. Real-time Fault-tolerant Communication in Computer Networks. PhD thesis, University of Michigan, 1993; Qin Zheng and Kang G. Shin. Fault-tolerant real-time communication in distributed computing systems. In Proc. 22nd Annual International Symposium on Fault-tolerant Computing, pages 86-93, 1992; Qin Zheng and Kang G. Shin. Real-time communication in local area ring networks. In Proceedings of Conference on Local Computer Networks, pages 416-425, September 1992; Qin Zheng and Kang G. Shin. On the ability of establishing real-time channels in point-to-point packet-switched networks. IEEE Transactions on Communication (in press), 1993; Qin Zheng, Kang G. Shin, and Abram-Profeta. Transmission of compressed digital motion video over computer networks. In Digest of COMPCON Spring'93, pages 37-46, February 1993;

SUMMARY OF THE INVENTION

The subject system solves this problem by calculating the synchronous bandwidth necessary for each application to satisfy its message-delivery delay requirement. The system is referred to herein as a synchronous bandwidth allocation (SBA) system. The calculation of bandwidth for each application is essential for effective use of the FDDI token ring networks in supporting such real-time communications as digital video/audio transmissions and distributed control/monitoring.

In FDDI token ring networks, to satisfy message delivery delay requirements of distributed real-time applications, the subject system calculates $h_i$, the synchronous bandwidth allocation for a particular node i. Specifically, for a real-time application (T, C,d), where T is minimum message inter-generation time, C is the maximum message transmission time, and d is the requested message delivery delay bound, the subject system calculates the minimum synchronous bandwidth allocation $h_i$ that the node needs to support the application under a given target token rotation time TTRT of the network. For certain cases, the synchronous bandwidth $h_i = (TTRT/T)C$.

In summary, a system is provided for generating the minimum synchronous bandwidth allocation $h_i$ for token ring networks in which this minimum bandwidth allocation is utilized by the node to request appropriate synchronous bandwidth reservation from the network manager. This permits the synchronous bandwidth allocation $h_i$ to be set dependent upon the minimum message generation period, T, the maximum message transmission time, C, the requested message delivery delay bound, d, and the target token rotation time of the network, TTRT. The system is not limited to d=T as is common in prior systems, but rather accommodates any value of d. As a result, the system is both simpler to implement, and covers many more applications having different message delivery time constraints. The calculation of $h_i$ is done by ensuring that the time that a node is allowed to transmit messages in the worst-case is no smaller than the time that the node needs to satisfy the message delivery time constraints.

BRIEF DESCRIPTION OF THE DRAWINGS

These and other features of the Subject Invention will be better understood in connection with the Detailed Description taken in conjunction with the Drawing of which:

The sole FIGURE is a block diagram depicting the system for setting the synchronous bandwidth allocation to support real-time communication over FDDI token ring networks.

DETAILED DESCRIPTION OF THE INVENTION

Referring now to the sole figure, a token ring network 10 is provided to which various nodes are coupled. In general, nodes refer to computers connected together by the ring which communicate with each other. A node 12 represents a destination node of a communication channel, whereas node 14 represents a source node. A network manager 18 is provided to manage synchronous bandwidth allocation among the nodes.

To open a synchronous channel, the source node must request a certain portion of synchronous bandwidth from the network manager 18. This request as indicated by arrow 20 is transmitted from node 14 to network manager 18. Network manager 18 replies to node 14 as illustrated by arrow 22. The request contains the synchronous bandwidth allocation $h_i$ that node 14 needs. $h_i$ is the time that node 14 is allowed to transmit synchronous messages once it gets the token. The network manager grants the request only if the total requested bandwidth allocations of all nodes do not exceed the target token rotation time of the ring, TTRT.

In the past, systems generated $h_i$ larger than necessary with the result of waste of network resources, meaning that fewer synchronous channels could be accommodated. In the subject system, an $h_i$ generator 24 is coupled to node 14 to provide an optimal short or minimum synchronous bandwidth allocation time.

As will be seen, the calculation for $h_i$ ensures that $h_i$ will be minimum by ensuring that the time that a node is allowed to transmit messages in the worst case is no smaller than the time that the node needs to satisfy the message delivery time constraints.

The following algorithm which results in the minimum $h_i$ required to establish a real-time channel, in one embodiment is:

1. For $2 \times TTRT \leq d \leq T + TTRT$, $$h_i = \begin{cases} C/p & \text{if } q \geq C/p \\ (C + q)/(1 + p) & \text{if } q < C/p \end{cases}$$

where $p = \lfloor d/TTRT - 1 \rfloor$ and
$q = \lceil d/TTRT \rceil TTRT - d$.

2. For $d \geq T + 2 \times TTRT$,
$h_i = (TTRT/T)C$

3. For $T + TTRT < d < T + 2 \times TTRT$ and $T \geq TTRT$, $$h_i \leq \begin{cases} C/p_0 & \text{if } q_0 \geq C/p_0 \\ (C + q_0)/(1 + p_0) & \text{if } q_0 < C/p_0 \end{cases}$$

-continued
where $p_0 = \lfloor T/TTRT \rfloor$ and
$q = \lceil T/TTRT \rceil TTRT - T$.

4. For $2 \times TTRT < d < T + 2 \times TTRT$ and
$T < TTRT$,
$h_i \leq \lceil TTRT/T \rceil C$.

By way of further explanation, the Fiber Distributed Data Interface (FDDI) is a proposed ANSI standard for a 100 Mbps token ring network using a fiber-optic medium. Thanks to its high transmission speed, the FDDI alleviates the bandwidth saturation problem of the current slower Ethernet and the IEEE 802.5 Token Rings. Furthermore, the synchronous transmission capacity of the FDDI also makes it capable of supporting such real-time applications like digital video/audio transmissions and distributed control/monitoring.

The synchronous transmission capacity of the FDDI is provided to each node in the form of two guarantees: a bounded medium access delay and a minimum throughput for synchronous traffic. Specifically, if the target token rotation time of an FDDI network is set to TTRT and the synchronous bandwidth allocation of node i is $h_i$, then the time node i needs to wait for a chance to transmit its synchronous messages is bounded by $2 \times TTRT$, and on the average, it is guaranteed to have a bandwidth of $h_i/TTRT \times 100$ Mbps to transmit its synchronous messages. These two properties make FDDI networks capable of supporting synchronous traffic, but they are not enough for most real-time applications.

A real-time application usually requires that each of its messages be delivered timely at a pre-specified message generation rate. But an FDDI network guarantees throughput and delay bound separately. When a node transmits synchronous messages at the guaranteed $h_i/TTRT \times 100$ Mbps throughput rate, it is not guaranteed that all of the messages will have a delay bound $2 \times TTRT$. To understand the problem better, consider the following video channel: 1) The source of the channel generates a video frame every T units of time. For full motion video, T=33 ms. 2) The time needed to transmit a maximum-size video frame at a 100 Mbps transmission rate is C units of time. 3) For a smooth real-time video at the destination, each frame is required to be delivered to the destination within d units of time after its generation. We assume d=T in this example.

With the parameters specified above, the maximum traffic over the video channel is $C/T \times 100$ Mbps. Thus the throughput requirement would be satisfied if the FDDI is configured such that $h_i/TTRT = C/T$. Also the delay requirement would be satisfied if $2 \times TTRT = T$. Together we have $h_i = C/2$. From the Medium Access Control (MAC) protocol of the FDDI, $h_i$ is the maximum time node i is allowed to have for transmitting synchronous messages once it gets the token. Thus, $h_i = C/2$ implies that a maximum-size video frame would take two token's visits to get transmitted. Since the TTRT is set to T/2, one token rotation time could be as large as T, so a maximum-size frame would not be transmitted within a delay bound T in the worst-case.

To solve the above problem one can either use a smaller TTRT to reduce the medium access delay bound or use a larger $h_i$ to increase the synchronous bandwidth assigned to the station. The first method is not very desirable for several reasons: First, TTRT is usually set at the ring initialization time. It would be inconvenient to change the TTRT whenever an application is created. Secondly, due to token passing overheads and ring latency, the overall ring efficiency would deteriorate if TTRT is setting too small. Thirdly, reducing TTRT also increases the synchronous bandwidth assigned to the station. The Subject Invention addresses the second method, e.g., increasing the synchronous bandwidth. The above problem is solved by developing a synchronous bandwidth allocation (SBA) system which, given a network target token rotation time TTRT and an application traffic specification, determines the synchronous bandwidth allocation $h_i$ of the node to guarantee that all messages be transmitted within the requested delay bound. The station management standard SMT 7.2 of the FDDI describes synchronous bandwidth allocation (SBA) facilities, which suggest how synchronous bandwidth may be allocated to a node, but it does not indicate how much of synchronous bandwidth needs to be assigned for a specific application. Clearly, the FDDI's capacity of supporting synchronous traffic cannot be effectively used without a proper SBA system.

There has been increasing research interest on SBA schemes recently. Agrawal et al. proposed a normalized proportional SBA scheme which was proven to be able to support any set of synchronous channels with a total peak signal rate no more than 33% of the ring bandwidth. But this scheme has the following problems. First, it can be used only for those applications where the requested message delay bound d equals the message generation period T. This limits the type of applications that a network can support. Secondly, the scheme is not optimal in the sense that the synchronous bandwidth assigned to an application may not be the minimum necessary, thus reduces the amount of synchronous traffic that a network can support. Thirdly, it is a global SBA scheme in that the allocation/deallocation of synchronous bandwidth to a node would require to change the synchronous bandwidths previously assigned to all other nodes. A global SBA scheme complicates the implementation of the synchronous bandwidth allocation.

As an improvement of the scheme of Agrawal et. al, Chen et al. proposed an optimal SBA scheme as noted in their paper noted above. However, their scheme still suffers the same limitation of d=T and is a global scheme. Besides, it uses an iterative algorithm for the calculation of the optimal bandwidths which may, in theory, need an infinite number of steps to converge.

In the Subject Invention, the SBA system does not require d=T and is optimal in most cases. The calculation of the optimal bandwidths can be done in just one step. Further, allocation/deallocation of a synchronous bandwidth to one node does not require to change the synchronous bandwidths assigned to other nodes, thus making the synchronous bandwidth allocation easy to implement.

For purposes of explanation, a review of the FDDI's MAC protocol and its relevant properties is presented.
Protocol 1 (MAC of the FDDI).
  p1: Suppose there are N active nodes in a ring which are numbered from 0 to N−1. As part of an FDDI ring initialization process, each node declares a Target Token Rotation Time (TTRT). The smallest among them is selected as the ring's TTRT. Each node which supports synchronous traffic is then assigned a portion of the TTRT to transmit its synchronous messages. Let $h_i$, called the synchronous bandwidth allocation, denote the portion of TTRT that node i is assigned to transmit its synchronous messages.

p2: Each node has two internal timers: the token-rotation-timer (TRT) and the token-holding-timer (THT). The TRT always counts up and a node's THT counts up only when the node is transmitting asynchronous messages. If a node's TRT reaches the TTRT before the token arrives at the node, the TRT is reset to 0 and the token is marked as late by incrementing the node's late count $L_c$ by one. To initialize the timers at different nodes, no messages are allowed to be transmitted during the first token rotation after the ring initialization and $L_c$'s are set to 0.

p3: Only the node that has the token is eligible to transmit messages. The message transmission time is controlled by the node's timers, but an in-progress message transmission will not be interrupted until its completion. When a node i receives the token, it does the following:

p3.1: If $L_c > 0$, set $L_c := L_c - 1$ and THT:=TTRT. Otherwise, set THT:=TRT and TRT:=0.

p3.2: If node i has synchronous messages, it transmits them for a time period up to $h_i$ or until all the synchronous messages are transmitted (Though it is not in the standard, we assume that a node always transmits its synchronous traffic first for a better synchronous performance of the network and simplicity of analysis), whichever occurs first.

p3.3: It node i has asynchronous messages, it transmits them until the THT counts up to the TTRT or all of its asynchronous messages are transmitted, whichever occurs first.

p3.4: Node i passes the token to the next node (i+1)-mod N.

Let $T_{ring}$ denote a ring's latency plus token passing overheads, which is the time needed to circulate the token around the ring once without transmitting any message, and $T_p$, denote the time needed to transmit a maximum-size asynchronous message. Then, the parameters of the FDDI's MAC protocol must satisfy the following protocol constraint:

$$\sum_{i=0}^{N-1} h_i \leq TTRT - T_{ring} - T_p. \quad (1)$$

The physical meaning of the above inequality is that the summation of the assigned synchronous bandwidths over the nodes in the network should not exceed the effective ring bandwidth. Violation of this constraint would make the ring unstable and oscillate between "claiming" and "operational". Under this protocol constraint, a well-known fact about the FDDI is that the worst-case token rotation time is bounded by 2×TTRT, and the average token rotation time is bounded by TTRT. A more general result was obtained by Agrawal et al. as stated below.

Lemma 1 (Worst-case token rotation times).

Under the protocol constraint (1), the time elasped between any n consecutive token's visits to a node i is bounded by $n \times TTRT - h_i$.

Once node i gets the token, it is given up to $h_i$ units of time to transmit its synchronous messages. The following lemma gives a lower bound of time that node i is allowed to transmit its synchronous messages during a time period t.

Lemma 2 (Synchronous transmission time).

Under the protocol constraint (1) of the FDDI, node i has at least $1 \lfloor t/TTRT - 1 \rfloor h_i$ units of time to transmit its synchronous messages during a time period t. This lower bound is reached when $\lceil t/TTRT - 1 \rceil TTRT - t \geq h_i$.

Lemmas 1 and 2 are the best published synchronous properties of the FDDI to date. The subject system depends on an improvement of Lemma 2 from which a new SBA system is derived.

As discussed before, an important feature of real-time communication is that each message must be delivered to its destination within a pre-specified delay bound. Due to the limited network transmission bandwidth, this requirement cannot be satisfied without some information on message generation characteristics.

In the subject system two parameters, T and C, are used to describe a message generation pattern, where T is the minimum message inter-generation time and C is the maximum message transmission time (i.e., the time needed to transmit a maximum-size message). It is reasonable to assume prior knowledge of these parameters for many real-time applications, such as interactive voice/video transmission and real-time control/monitoring. For applications where the traffic pattern is less predictable, the estimated values of T and C could be used. A process may exceed its pre-specified maximum message size and/or message generation rate at the risk that these messages may not be delivered within the pre-specified delay bound, but this particular process will not affect the guarantees of other applications.

Together with the requested message-delivery delay bound d and the address of the source node i, the concept of a real-time channel for real-time communications is used. A real-time channel is described by a 4-tuple $\tau = (T,C,d,i)$ which guarantees each message generated at the source node s to be delivered sequentially to one or more destination nodes in a time period $\leq d$, as long as the message inter-generation time is $\geq T$ and the message transmission time is $\leq C$.

A real-time channel is a convenient way to achieve real-time communication. Users can set up channels with adequate bandwidths and delay bounds for their applications. This is in sharp contrast to the conventional circuit-switched transmission where users have few choices on the bandwidth and quality of the circuits. The Subject Invention deals with the implementation of real-time channels in FDDI networks only.

A set of real-time channels is said to be establishable over an FDDI network if the requested message delivery delay bound of each channel can be guaranteed by properly setting the parameters of the FDDI's MAC protocol. From Protocol 1, the user-adjustable parameters are the TTRT and $h_i$'s. The TTRT is usually set at the network initialization time and does not change frequently. It determines the minimum message delay bound, $d_{min} = 2 \times TTRT$; that the network can guarantee. Any channel request with a delay bound smaller than $d_{min}$ will be rejected. With a given TTRT, the synchronous bandwidth allocated to node i is determined by the value of $h_i$. Thus, an SBA scheme determines the values of $h_i$'s to accommodate real-time channels. An SBA scheme is said to be feasible with respect to a set of real-time channels if it can guarantee the requested delay bounds of the channels. An SBA scheme is said to be optimal if it is always feasible whenever there exists a feasible SBA scheme. The advantage of an optimal SBA scheme is the full-utilization of the FDDI's synchronous transmission capacity since a set of real-time channels rejected by an optimal SBA scheme can not be established with any other SBA schemes.

The conditions for establishing real-time channels over an FDDI network are now derived. From these conditions, the new SBA system will be developed.

Let $\Gamma(t)$ denote the time that a node in the worst-case is allowed to transmit its synchronous messages during a time period t. Lemma 2 gives a lower bound of $\Gamma(t)$ for node i. We improve Lemma 2 by calculating the exact value of $\Gamma(t)$ as follows.

Lemma 3 (Worst-case synchronous transmission time).

Under the protocol constraint (1) of the FDDI, node i in the worst-case has $$\Gamma(t) = \lfloor t/TTRT - 1 \rfloor h_i + \delta(t)$$

units of time to transmit its synchronous messages during a time period t, where $\delta(t)$ is calculated as $$\delta(t) = \begin{cases} 0 & \text{if } \lceil t/TTRT \rceil TTRT - \\ & t \geq h_i \text{ or } t \leq TTRT \\ t - (\lceil t/TTRT \rceil TTRT - h_i) & \text{otherwise.} \end{cases}$$

Suppose no two real-time channels have the same source node and the synchronous transmission time of a node is used for real-time channel messages only. Then from Lemma 3, we have the following necessary and sufficient condition for the establishment of a real-time channel over an FDDI network.

Theorem 1 (Channel establishment conditions over the FDDI).

A real-time channel $\tau = (T,C,d,i)$ can be established over an FDDI network under the protocol constraint (1) if and only if $$\bigvee t \geq 0, \lceil (t-d)/T \rceil^+ C \leq \Gamma(t), \tag{2}$$

where $\Gamma(t)$ is calculated from Lemma 3 with i=s, and $\lceil x \rceil^+ = n$ if $n-1 \leq x < n$, $n=1,2,\ldots$, and $\lceil x \rceil^+ = 0$ for $x < 0$.

It is difficult to calculate the minimum synchronous bandwidth allocation (i.e., $h_i$) needed for a real-time channel from Theorem 1 since inequality (2) must be checked in an interval of infinity length. Fortunately, with the following theorem, one can easily calculate the required minimum synchronous bandwidth allocation in most cases (i.e., when $2 \times TTRT \leq d \leq T + TTRT$, or $d \geq T + 2 \times TTRT$), and the upper bound of $h_i$ for other cases.

Theorem 2 (Calculation of $h_i$).

The minimum $h_i$ required to establish a real-time channel (T,C,d,i) can be calculated as 1. For $2 \times TTRT \leq d \leq T + TTRT$, $$h_i = \begin{cases} C/p & \text{if } q \geq C/p \\ (C + q)/(1 + p) & \text{if } q < C/p \end{cases}$$

where $p = \lfloor d/TTRT - 1 \rfloor$ and $q = \lceil d/TTRT \rceil TTRT - d$.

2. For $d \geq T + 2 \times TTRT$, $$h_i = (TTRT/T)C$$

3. For $T + TTRT < d < T + 2 \times TTRT$ and $T \geq TTRT$, $$h_i \leq \begin{cases} C/p_0 & \text{if } q_0 \geq C/p_0 \\ (C + q_0)/(1 + p_0) & \text{if } q_0 < C/p_0 \end{cases}$$

where $p_0 = \lfloor T/TTRT \rfloor$ and $q = \lceil T/TTRT \rceil TTRT - T$.

4. For $2 \times TTRT < d < T + 2 \times TTRT$ and $T < TTRT$, $$h_i \leq \lceil TTRT/T \rceil C.$$

From the Theorem 2, we have the following channel establishment algorithm.

Algorithm 1 (Channel establishment over FDDI).

Suppose n−1 real-time channels $\tau_i = (T_i, C_i, d_i, s_i)$, i=1, ..., n−1 have already been established over an FDDI ring. Then a new channel $\tau_n = (T_n, C_n, d_n, i)$ can be established with the following steps.

Step 1: (Calculate $h_i$ from Theorem 2.

Step 2: If the protocol constraint (10 is satisfied, set the synchronous bandwidth allocation of i to $h_i$ and establish channel $\tau_n$. Otherwise, the channel establishment request is rejected.

As to the above algorithm, for $T + TTRT < d < T + 2 \times TTRT$, Theorem 2 gives only an upper bound of the minimum $h_i$. To see how tight this upper bound is, notice that a necessary condition for the establishment of a real-time channel over an FDDI network is that the assigned synchronous bandwidth ($h_i/TTRT \times 100$ Mbps) must not be smaller than the expected signal bandwidth ($C/T \times 100$ Mbps) to be transported over tile channel. This means that $h_i \geq (TTRT/T)C$ is a necessary condition and $(TTRT/T)C$ is a lower bound of the required $h_i$. Thus the difference between the upper bounds given in Theorem 2 and the minimum $h_i$ is bound by $$\beta = \begin{cases} (1/\lfloor x \rfloor - 1/x)C & \text{if } x \geq 1 \\ (\lceil 1/x \rceil - 1/x)C & \text{if } x < 1 \end{cases}$$

where $x = T/TTRT$.

From this we see that the upper bound obtained in Theorem 2 will never exceed twice the minimum $h_i$. Another result is that the upper bound given in from Theorem 2 is actually the minimum $h_i$ when T is a multiple of TTRT or TTRT is a multiple of T.

Secondly, Algorithm 1 is an optimal SBA scheme when a minimum $h_i$ can be obtained from Theorem 2. This includes the following four situations, 1. $2 \times TTRT \leq d \leq T + TTRT$,
2. $d \geq T + 2 \times TTRT$,
3. T is a multiple of TTRT,
4. TTRT is a multiple of T.

Note that the above situations include most real-time communication applications. For example, communications in distributed control/monitoring systems usually have tight delay requirements ($d \leq T + TTRT$), and video/audio communications can often tolerate large delays ($d \geq T + 2 \times TTRT$). Thus for most applications, synchronous bandwidth allocation with Algorithm 1 is optimal.

As to the advantages of the Subject Invention in terms of generality, the prior SBA schemes can establish real-time channels with d=T only, while Algorithm 1 can establish channels of arbitrary parameters, i.e., $d \leq T$ or $d > T$. This extension is very important in practice since for many applications, especially those in real-time control/monitoring systems, the required delay bound d is usually smaller than the message intergeneration period T. Real-time channels with $d > T$ are also useful for multimedia applications. Thus restricting d=T would greatly limit a network's ability and effectiveness of supporting real-time communications.

As to optimality, the SBA scheme of Agrawal et. al is not optimal, even under the restrictive assumption d=T. Thus a real-time channel establishment request may be rejected even if it can be established using another scheme. The SBA scheme of Chen et. al is optimal under the restrictive assumption of d=T and requires complex computations. By contrast, Algorithm 1 is optimal for a lot wider range of d, which subsumes the special case d=T of prior SBA schemes.

Finally as to simplicity, the prior SBA schemes of are global schemes in the sense that the addition/removal of a channel or change of the parameters of a channel would require adjustment of the synchronous bandwidth allocations of all nodes in the network. This requires a complex SBA implementation. By contrast, Algorithm 1 needs only local parameter adjustment, thereby making it far easier to implement than prior schemes.

As an application example of Algorithm 1, one can calculate the synchronous bandwidth needed for establishing the following video channel in an FDDI network. Suppose the video frame generation period T=33 ms (30 frames/second), the transmission time of a maximum frame is 1 ms(100 Kb maximum frame size), and the requested frame delay bound is d ms. The maximum expected traffic of this video channel is thus $B_c = C/T \times 100 = 3$ Mbps. Suppose the network target token rotation time is set to a typical value TTRT=8 ms.

Since d must be no smaller than 2×TTRT, the above video channel cannot be established for d<16 ms. For $16 \leq d \leq T+TTRT=41$ ms, the minimum required $h_i$ is calculated from Theorem 2 as $$h_i = \begin{cases} 1/p & \text{if } q \geq 1/p \\ (1+q)/(1+p) & \text{if } q < 1/p \end{cases}$$

where $p = \lfloor d/8 - 1 \rfloor$ and $q = \lceil d-8 \rceil 8 - d$.
For $d \geq T + 2 \times TTRT = 49$ ms, $h_i = (TTRT/T)C = 0.24$ ms.

For 41 ms < d < 49 ms, we use the upper bound given in Theorem 2, $h_i = C/p_0 = 0.25$ ms.

Recalling that the synchronous bandwidth assigned to a channel is $B_i = h_i TTRT \times 100$ Mbps, the value of $B_i$ as a function of d yielding the following observations.

First, The smaller the requested delay bound d, the more synchronous bandwidth is required by the channel. For example, the video channel needs to reserve 12.5 Mbps synchronous bandwidth, which is more than four times as much as the expected signal bandwidth over the channel, to guarantee that each video frame be delivered within a delay bound d<23 ms. In general, a channel requires synchronous bandwidth approximately $T/(\lfloor d/TTRT - 1 \rfloor \ TRT)$ times as much as its expected maximum signal bandwidth to guarantee a delay bound d (from Theorem 2). This shows that the FDDI is not very efficient in supporting real-time communications with tight delay requirement. A simple modification to the MAC protocol of the FDDI was proposed by Kang G. Shin and Qin Zheng which can significantly improve FDDI's ability of supporting real-time traffic requiring small delay bounds.

Secondly, the required synchronous bandwidth reduces to the expected signal bandwidth for $d \geq T + 2 \times TTRT = 49$ ms. This fact has two implications. (1) If a channel is assigned a synchronous bandwidth equal to its expected signal bandwidth, it is guaranteed that each of its message will be transmitted with a delay no larger than $T + 2 \times TTRT$ (or $T + TTRT$ if T is a multiple of TTRT). This is in contrast to the common misunderstanding that the message delay bound equals the medium access delay bound $2 \times TTRT$. (2) One does not gain anything by allowing message delay to be larger than $T + 2 \times TTRT$. In other words, a video channel which allows its frames to be delayed as large as 500 ms needs the same synchronous bandwidth as a channel requiring frame delays to be no more than 50 ms in the above example. This finding is very useful for designing distributed multimedia systems over FDDI networks.

Thirdly, the difference between the upper bound of $h_i$ calculated from Theorem 2 and the actual minimum $h_i$ is negligible if T is several times larger than TTRT. The difference increases with the decrease of T. So if one has to set $T + TTRT < d < T + 2 \times TTRT$ and T is not a multiple of TTRT, TTRT should be set as small as possible to avoid over-reservation of synchronous bandwidth.

Algorithm 1 can also be used for real-time channels with a common source node. Specifically, if two channels $\tau_1$ and $\tau_2$ have the same source node s, and $\tau_1$ requires $h_i = t_1$ and $\tau_2$ requires $h_i = t_2$. Then setting $h_i = t_1 + t_2$ will satisfy the requirements of both channels provided there is a mechanism at the source node to regulate the transmission times of the messages of $\tau_1$ and $\tau_2$ so as not to exceed $t_1$ and $t_2$ at each token's visit, respectively.

Having above indicated a preferred embodiment of the present invention, it will occur to those skilled in the art that modifications and alternatives can be practiced within the spirit of the invention. It is accordingly intended to define the scope of the invention only as indicated in th following claims.

What is claimed is:

1. A system for controlling the flow of information around a network comprising:
   an FDDI network having a number of nodes, each of said nodes having means for requesting a synchronous bandwidth allocation time to permit transmission of synchronous messages over said network;
   a network manager for receiving a synchronous bandwidth allocation time request from one of said nodes and for checking the request to ascertain if it can be granted based on the total allocated synchronous bandwidth times from all nodes in the system;
   means for generating a signal corresponding to the target token rotation time, TTRT, for the network;

means for generating a signal corresponding to a minimum message generation time, T;

means for generating a signal corresponding to a maximum message transmission time, C;

means for generating a signal corresponding to a requested message delivery delay bound time, d;

means at each node responsive to said signals corresponding to TTRT, T, C, and d for specifying the amount of synchronous bandwidth allocation time required to support a predetermined application at said node, said means for specifying the amount of synchronous bandwidth allocation time including means for generating a synchronous bandwidth allocation time signal, $h_i$, for the node i corresponding to the amount of synchronous bandwidth allocation time required for said node, such that the time that any of the nodes, i, associated with said network is allowed to transmit messages in the worst case is no smaller than the time that a node i needs to satisfy the message delivery time constraints of said network; and means for coupling said synchronous bandwidth allocation time signal, $h_i$, to said network manager.

2. A method for controlling the flow of information around an FDDI network having a number of nodes, each of said nodes having means for requesting a synchronous bandwidth allocation time to permit transmission of synchronous messages over said network, said network having a network manager for receiving a synchronous bandwidth allocation time request from one of said nodes and for checking the request to ascertain if it can be granted based on the total allocated synchronous bandwidth times from all nodes in the system, comprising the steps of generating a signal corresponding to the target token rotation time, TTRT, for the network;

generating a signal corresponding to a minimum message generation time, T;

generating a signal corresponding to a maximum message transmission time, C;

generating a signal corresponding to a requested message delivery delay bound time, d;

at each node responsive to said signals corresponding to TTRT, T, C, and d specifying the amount of synchronous bandwidth allocation time required to support a predetermined application at said node by generating a synchronous bandwidth allocation time signal, $h_i$, for the node i corresponding to the amount of synchronous bandwidth allocation time required for said node, such that the time that any of the nodes, i, associated with said network is allowed to transmit messages in the worst case is no smaller than the time that a node i needs to satisfy the message delivery time constraints of said network; and coupling said synchronous bandwidth allocation time signal, $h_i$, to said network manager, the step of generating said synchronous bandwidth time including for node i the step of setting $h_i$ in accordance with 1. For $2 \times TTRT \leq d \leq T + TTRT$, $$h_i = \begin{cases} C/p & \text{if } q \geq C/p \\ (C+q)/(1+p) & \text{if } q < C/p \end{cases}$$

where $p = \lfloor d/TTRT - 1 \rfloor$ and
$q = \lceil d/TTRT \rceil TTRT - d$.

2. For $d \geq T + 2 \times TTRT$,
$h_i = (TTRT/T)C$

3. For $T + TTRT < d < T + 2 \times TTRT$ and $T \geq TTRT$, $$h_i \leq \begin{cases} C/p_0 & \text{if } q_0 \geq C/p_0 \\ (C+q_0)/(1+p_0) & \text{if } q_0 < C/p_0 \end{cases}$$

where $p_0 = \lfloor T/TTRT \rfloor$ and
$q = \lceil T/TTRT \rceil TTRT - T$.

4. For $2 \times TTRT < d < T + 2 \times TTRT$ and $T < TTRT$,
$h_i \leq \lceil TTRT/T \rceil C$.

* * * * *